US008699560B2

(12) United States Patent
Berhorst et al.

(10) Patent No.: US 8,699,560 B2
(45) Date of Patent: *Apr. 15, 2014

(54) METHOD FOR WIRELESS DATA TRANSMISSION BETWEEN A BASE STATION AND A PASSIVE TRANSPONDER, AS WELL AS A PASSIVE TRANSPONDER

(75) Inventors: Martin Berhorst, Heidelberg (DE); Alexander Kurz, Schwaebisch Hall (DE); Peter Schneider, Hassmersheim (DE)

(73) Assignee: Atmel Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/434,591

(22) Filed: Mar. 29, 2012

(65) Prior Publication Data

US 2012/0194323 A1 Aug. 2, 2012

Related U.S. Application Data

(63) Continuation of application No. 11/946,034, filed on Nov. 27, 2007, now Pat. No. 8,165,193.

(60) Provisional application No. 60/861,100, filed on Nov. 27, 2006.

(30) Foreign Application Priority Data

Nov. 27, 2006 (DE) .......................... 10 2006 057 602

(51) Int. Cl.
*H03K 9/06* (2006.01)
(52) U.S. Cl.
USPC .......................................................... 375/239
(58) Field of Classification Search
USPC ....... 375/239; 370/205, 213; 327/1; 329/313; 332/112
See application file for complete search history.

(56) References Cited

U.S. PATENT DOCUMENTS

| 4,180,815 | A | * | 12/1979 | Hill ................................ 342/43 |
| 5,345,231 | A | * | 9/1994 | Koo et al. ................. 340/870.31 |
| 6,044,333 | A | * | 3/2000 | Stobbe et al. ................. 702/106 |
| 6,127,929 | A | * | 10/2000 | Roz ............................. 340/572.5 |
| 6,147,591 | A | * | 11/2000 | Stobbe et al. ................. 340/10.51 |
| 6,198,382 | B1 | * | 3/2001 | Berger et al. ............... 340/10.34 |
| 6,531,957 | B1 | * | 3/2003 | Nysen .......................... 340/10.1 |
| 6,882,826 | B2 |   | 4/2005 | Hediger et al. |
| 7,240,838 | B2 | * | 7/2007 | Bui et al. ........................ 235/451 |
| 7,376,391 | B2 | * | 5/2008 | Friedrich et al. ............. 455/41.1 |
| 7,501,953 | B2 |   | 3/2009 | Diorio et al. |
| 2005/0053024 | A1 | * | 3/2005 | Friedrich ..................... 370/313 |
| 2005/0056704 | A1 |   | 3/2005 | Kim |
| 2005/0083179 | A1 | * | 4/2005 | Carrender et al. ........... 340/10.4 |
| 2008/0197976 | A1 |   | 8/2008 | Littlechild et al. |

OTHER PUBLICATIONS

Read/Write Transponder TK 5552, Atmel corporation, Rev. 4698B-RFID-08/05, pp. 1-24.*

* cited by examiner

*Primary Examiner* — Shuwang Liu
*Assistant Examiner* — Helene Tayong
(74) *Attorney, Agent, or Firm* — Baker Botts LLP

(57) ABSTRACT

A method for wireless data transmission, in, for example, RFID systems, between a base station and a passive transponder, as well as a passive transponder is provided by inductive coupling, as well as a passive transponder. It is possible to transmit data from the base station to the transponder by a first data transmission protocol type and by at least one second data transmission protocol type, whereby the first or the at least second data transmission protocol type is selected by writing a configuration register in the transponder.

21 Claims, 2 Drawing Sheets

METHOD FOR WIRELESS DATA TRANSMISSION BETWEEN A BASE STATION AND A PASSIVE TRANSPONDER, AS WELL AS A PASSIVE TRANSPONDER

RELATED APPLICATIONS

This application is a continuation of U.S. application Ser. No. 11/946,034, filed Nov. 27, 2007, and entitled "Method for Wireless Data Transmission Between a Base Station and a Passive Transponder, as well as a Passive Transponder," which issued on Apr. 24, 2012 as U.S. Pat. No. 8,165,193, which claims priority to German Patent Application No. DE 102006057602, which was filed in Germany on Nov. 27, 2006, and to U.S. Provisional Application No. 60/861,100, which was filed on Nov. 27, 2006.

BACKGROUND OF THE INVENTION

1. Field of the Invention

The present invention relates to a method for wireless data transmission between a base station and a transponder by inductive coupling, as well as to a passive transponder.

2. Description of the Background Art

Contactless identification systems or so-called radio-frequency-identification (RFID) systems typically include a base station or a reading device or a reading unit and a plurality of transponders or remote sensors. The transponders or their transmitting and receiving devices typically do not have an active transmitter for data transmission to the base station. Such inactive systems are called passive systems when they do not have their own power supply, and semipassive systems when they have their own power supply. Passive transponders draw the power necessary for their supply from the electromagnetic field emitted by the base station.

For data transmission between the transponder and the base station, for a programming operation of the transponder, for example, the transponder has an interface of a specific interface type, which is compatible with the corresponding interface type of the base station. The interface types can be divided, in a preliminary rough grouping, into contact and contactless types.

The interface types with which the data transmission occurs contactless or contact-free differ, inter alia, in the operating or carrier frequency used for the data transmission, i.e., the frequency transmitted by the base station. Frequently used frequencies are, for example, 125 kHz (LF range), 13.56 MHz (RF range), a frequency range between 860 MHz to 960 MHz (UHF range), and a frequency range greater than 3 GHz (microwave range).

Another differentiating feature of the different interface types is the type of coupling between the specific interfaces of the transponder and the base station. In this case, the so-called inductive or magnetic coupling and the so-called far-field coupling, among others, are differentiated. Described in simplified terms, in inductive or near-field coupling, an antenna coil of the base station and an antenna coil connected to the input circuit of the transponder form a transformer, which is why this type of coupling is also called transformer coupling. In inductive coupling, a maximum distance between the transponder and the base station is limited to the near field of the employed antenna. The near-field range is substantially established by the operating frequency of the interface.

The so-called load modulation is usually used in inductive coupling for data transmission from a transponder to a base station; in this regard, see, for example, RFID-Handbuch [RFID Manual] by Klaus Finkenzeller, $3^{rd}$ edition, Chapter 3.2.1.2.1 "Load Modulation," starting on page 44.

For data transmission from the base station to the transponder, in inductive coupling the base station usually transmits a carrier signal with a frequency within a frequency range of from 50 kHz to 250 kHz. To begin the data transmission, the base station via amplitude modulation of the carrier signal first generates a short field gap (gap, notch); i.e., the amplitude of the carrier signal is dampened or attenuated briefly, for example, for about 50 us to 400 us, or totally suppressed.

Characters transmitted subsequent to the initiation of the data transmission by the base station are encoded by the associated durations between temporally successive field gaps. A first character value is hereby assigned a first duration and at least one second character value is assigned a second duration. To decode the transmitted characters, the transponder ascertains the specific durations between the field gaps and determines the value of the transmitted character from the ascertained duration.

For error-free data transmission or decoding of the characters, it is necessary that the signal responses generated by the base station and received by the transponder by inductive coupling have established maximum tolerances, for example, in regard to their time course and/or employed level.

To increase the achievable ranges between base station and passive transponders, the quality of a parallel resonant circuit, formed by the antenna coil and a capacitor connected parallel thereto, is increased in order to enable the supplying of the passive transponder from the field transmitted by the base station at greater distances as well. The reduced damping of the resonant circuit has the effect that at a field gap the coil voltage or the voltage of the parallel resonant circuit of the transponder declines more slowly than in the case of a resonant circuit of lower quality and therefore higher damping. Because the field gap in the transponder can be detected, however, only when the coil voltage or a voltage obtained from the coil voltage by rectification has declined below a settable potential, field gaps can be detected in a delayed manner in comparison with a resonant circuit of a lower quality. This has the result that the duration of the field gaps detected in the transponder are shortened and the durations between the field gaps, which represent the corresponding character value, are lengthened. This change in the timing of the signal courses detected in the transponder is influenced directly by the quality of the resonant circuit. In other words, the timing of the signals received in the transponder substantially depend on various parameters, for example, on the employed antenna coil, as a result of which an error-free data transmission cannot always be guaranteed in the case of changes in parameters.

However, this method cannot be carried out with transponders that do not support this method or this transmission protocol, because these interpret the reference duration already as a character, as a result of which the character sequence received in the transponder is corrupted. Replacement of transponders, not supporting the method with consideration of the reference duration, with transponders supporting this method and vice versa is therefore not readily possible.

To be able to ensure interference-free data transmission also in the case of such parameter-dependent timing variations, German Patent Application DE 101 38 218 A1, which corresponds to U.S. Pat. No. 6,882,826, and which is incorporated herein by reference, describes a process in which after initiation of the data transmission a reference duration is transmitted by successive field gaps by the base station, with which a calibration value is determined in the transponder, whereby the calibration value is used for calibrating the subsequently received durations. The reference duration in this case corresponds to a known character value, for instance, "0". Because it is known in the transponder how long the duration belonging to the character value "0" must be, and thus, the calibration or offset value can be calculated from the actual, measured reference duration.

SUMMARY OF THE INVENTION

It is therefore an object of the present invention to provide a method for wireless data transmission between a base station and a passive transponder by means of inductive coupling and a passive transponder, which have a high flexibility during use in different data transmission protocol types.

In the method for wireless data transmission between a base station and a passive transponder by means of inductive coupling, it is possible to transmit data from the base station to the transponder, i.e., in the so-called forward link, by means of a first data transmission protocol type and by means of at least one second data transmission protocol type. The first data transmission protocol type and the at least second data transmission protocol type can differ, for example, in that in the first data transmission protocol type no reference duration is transmitted as a calibration value and that in the second data transmission protocol type a reference duration is transmitted as a calibration value. The first or the at least second data transmission protocol type is selected according to the invention by writing a configuration register in the transponder. This creates high flexibility during use of different data transmission protocol types, because only one register value according to the desired data transmission protocol type is to be set for protocol type selection.

In a development of the method, the configuration register is written by a command transmitted by the base station to the transponder. Alternatively or in addition, the configuration register can also be written during the manufacture of the transponder, for example, by means of a wireless or hardwired programming device provided especially for this.

In a development of the method, in the first data transmission protocol type and also in the at least second data transmission protocol type, the base station transmits a carrier signal with a frequency within a frequency range of from 50 KHz to 250 KHz, a data transmission is initiated by the base station by generating a field gap (gap, notch) of the carrier signal, characters, transmitted by the base station to the transponder, are encoded by associated durations between temporally successive field gaps, and a first character value is assigned a first duration and at least one second character value is assigned a second duration. Preferably, in the first data transmission protocol type, the data transmission is always ended when a maximum value for the duration between successive field gaps is exceeded. Preferably, in the at least second data transmission protocol type, after initiation of the data transmission, a reference duration is transmitted by the base station, by means of which a calibration value is determined in the transponder, whereby the calibration value is used for calibrating the successively received durations. This type of transmission method, also with a first and a second data transmission protocol type, is described, for instance, in the German patent application DE 10 2006 007 262 of the applicant, which was not prepublished and is herewith incorporated by reference into the content of the present description.

In the transponder of the invention for wireless data transmission between a base station and a transponder by means of inductive coupling, it is possible to transmit data from the base station to the transponder by means of a first data transmission protocol type and by means of at least one second data transmission protocol type. A wireless and/or hardwired writeable configuration register of the transponder is used to select the first or the at least second data transmission protocol type. The transponder is designed in particular for carrying out the method of the invention.

In a development of the transponder, the configuration register is made as an EEPROM. Alternatively, it can be made as a one-time programmable memory, for example, ROM, or also as a volatile memory, for example, RAM. If the configuration register is made as a volatile memory, the configuration register is set after each power-on-reset (POR) of the transponder. This may be undertaken, for example, in a wireless manner by a base station as soon as the transponder enters its response range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
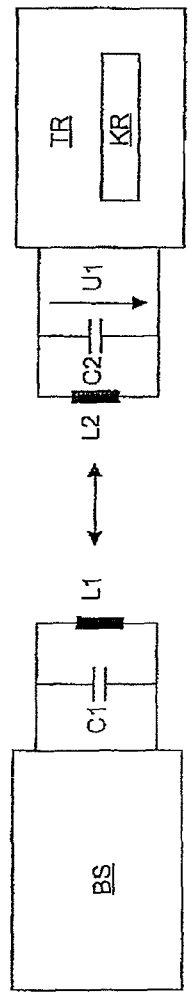
FIG. 1 illustrates an RFID system with a base station and a transponder of the invention.

FIG. 1 shows an RFID system with a base station BS and a passive transponder TR. For data transmission by means of inductive coupling, base station BS customarily has an antenna coil L1 and a capacitor C1. Transponder TR accordingly also has an antenna coil L2 and a capacitor C2. Antenna coils L1 and L2 form a transformer in a near field of the respective antenna coils L1 and L2.

The transponder has a configuration register KR made as an EEPROM, which is used to select a first or an at least second data transmission protocol type. The different data transmission protocol types are described hereafter under reference to FIG. 2 and FIG. 3.

For data transmission from base station BS to transponder TR, base station BS generates a carrier signal with a frequency of 125 kHz, whose amplitude is totally suppressed for generating field gaps. The data transmission from transponder TR to base station BS occurs by means of load modulation.

Figure 2:
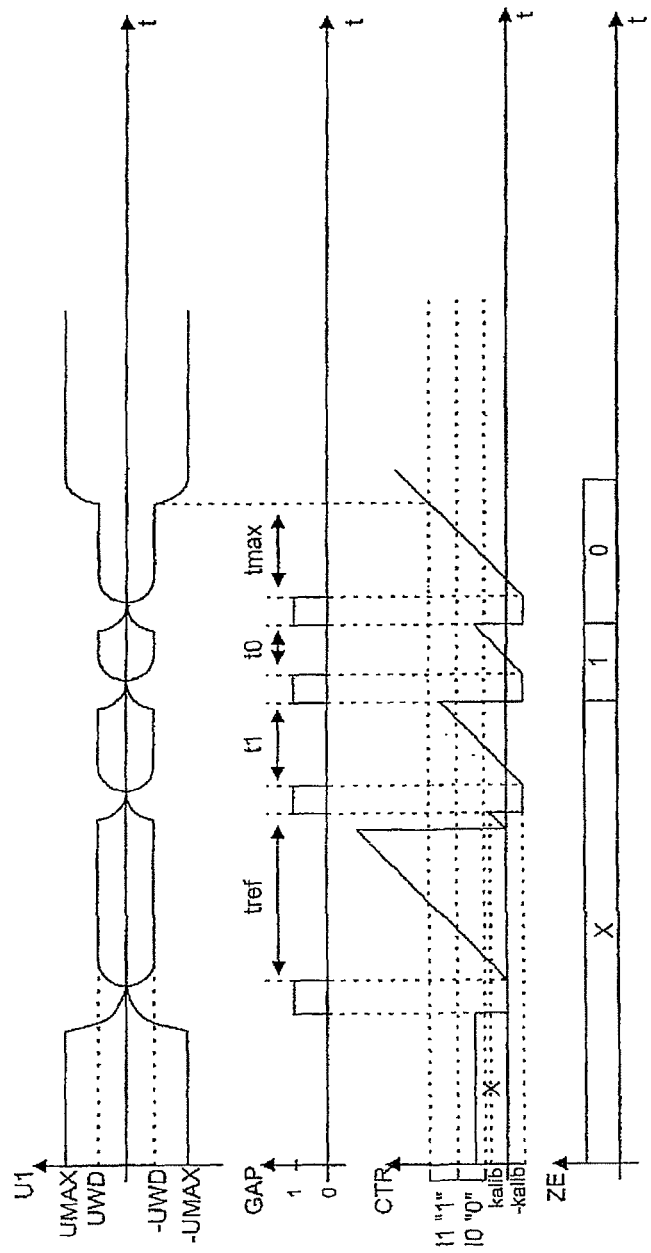
FIG. 2 shows timing diagrams of signals during a data transmission from the base station to the transponder of FIG. 1 according to a second data transmission protocol type, in which the base station transmits a reference duration for generating a calibration value in the transponder.

FIG. 2 shows timing diagrams of signals during a data transmission from base station BS to transponder TR of FIG. 1 according to a second data transmission protocol type, in which at the start of the data transmission base station BS transmits a reference duration tref for generating a calibration value in transponder TR. The configuration register KR of the transponder hereby has a value that selects the second data transmission protocol type.

Before the data transmission, base station BS by means of its antenna coil L1 generates an alternating magnetic field with a frequency of 125 kHz, which due to the inductive coupling induces an alternating voltage U1 in antenna coil L2 of transponder TR, whereby only the envelope curve of the alternating voltage U1 is shown in FIG. 2. An amplitude of the alternating voltage U1 is limited or clamped to a maximum voltage UMAX by clamp diodes (not shown) of transponder TR.

To initiate the data transmission within the scope of write access to transponder TR, base station BS generates a field gap (gap, notch) by suppressing the carrier signal. Because of the high quality of the parallel resonant circuit, however, the voltage U1 drops only slowly along the shown envelope curve. The course of the voltage U1 is evaluated in transponder TR. When the voltage U1 falls below an internal threshold value for the first time, an active signal GAP is generated transponder-internally. The signal GAP activated for the first time has the effect that the maximum voltage U1 is limited or clamped to a value UWD which is lower than the value UMAX. The voltage limitation to the value UWD occurs in transponder TR typically in that a threshold voltage element is short-circuited by a parallel-connected switching element.

The voltage U1 is limited to the value UWD until an end of the data transmission is detected in the transponder TR. The end of the data transmission is detected in the transponder TR when a maximum duration value tmax between successive field gaps or gaps has been exceeded.

After the first field gap is generated, a transponder-internal counter CTR is initialized from a previously undefined counter value "X" to a counter value of "0." The counter or the counter value CTR is incremented after this beginning at the falling edge of the first gap signal in the cycle or with each new period of the carrier signal. The reference duration tref, i.e., the duration between the falling edge of the first gap signal and the rising edge of the successive second gap signal, is so large in the exemplary embodiment shown in FIG. 2 that the counter value CTR overflows once and runs again with the counter value "0." In the case of the rising edge of the second gap signal, the counter has a counter value "calib" which, having a negative sign, is used as the starting value of the counter during the subsequent duration measurements. Alternatively, the reference duration tref can also be selected for this in such a way that it corresponds to a known character value, for example, "0". Because it is known in the transponder how long the duration belonging to the character value "0" must be theoretically, the calibration or offset value can be calculated from the actual reference duration measured in the transponder or the associated counter value CTR.

In the case of the falling edge of the second gap signal, the counter CTR is incremented in the cycle of the carrier signal beginning at a value "−calib." In the case of the rising edge of the third gap signal, the counter value CTR is read and the range of the read counter value is checked. The counter value CTR is within a value range or interval, which corresponds to a character value of "1," i.e., to a duration "t1," which is used by the base station for encoding a character with the value "1."

After counter value CTR is read, the counter CTR is again preloaded with the calibration value "−calib." In the case of the falling edge of the third gap signal, the counter CTR is incremented in the cycle of the carrier signal beginning at the value "−calib. In the case of the rising edge of the fourth gap signal, the counter value CTR is read and the range of the read counter value is checked. The counter value CTR is within a value range or interval that corresponds to a character value of "0," i.e., to a duration "t0," used by the base station for encoding a character with the value "0."

The character values decoded in transponder TR are shown in the lower diagram of FIG. 2. The character "X" in this case represents an undefined character value.

Because base station BS in the shown exemplary embodiment transmits only the exemplary bit sequence "10" to transponder TR, additional field gaps are no longer generated after the fourth field gap within the scope of the data transmission. In other words, in the case of the falling edge of the fourth gap signal, the counter CTR is incremented in the cycle of the carrier signal again beginning at the value "−calib." When the counter value CTR leaves the interval assigned to the character value "1," transponder TR detects that the maximum duration value tmax between successive field gaps has been exceeded and ends the current data transmission, i.e., resets its receiving unit. This has the effect, among others, that the maximum value of the voltage U1 is again raised to UMAX, because the bridging of the threshold value element, effecting the voltage limitation to UWD, is again separated.

Transponder TR can again receive data in a subsequent data transmission procedure. Owing to the calibration of the duration measurement by means of the reference duration tref, timing variations in the detected gap signals, for example, due to different qualities of antenna coils L2 of different transponders, can be compensated.

Figure 3:
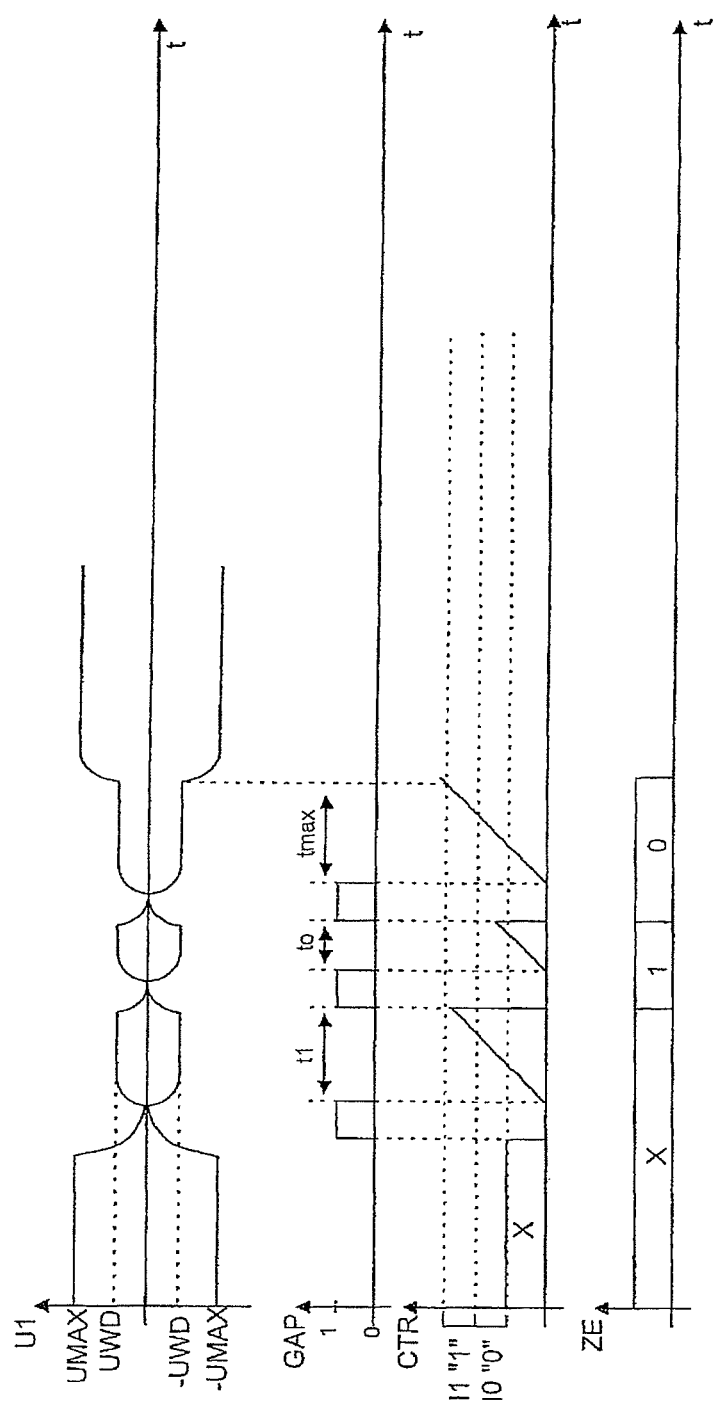
FIG. 3 shows timing diagrams of signals during a data transmission according to the invention from the base station to the transponder of FIG. 1 according to a first data transmission protocol type, in which the base station transmits no reference duration for generating a calibration value in the transponder.

FIG. 3 shows timing diagrams of signals during a data transmission according to the invention from base station BS to transponder TR of FIG. 1 according to a first data transmission protocol type, in which the base station transmits no reference duration tref for generating a calibration value in the transponder. The configuration register KR of the transponder hereby has a value that selects the first data transmission protocol type.

After the generation of the first field gap by the base station BS, as in the previously described example, the transponder-internal counter CTR is initialized from the previously undefined counter value "X" to the counter value "0." The counter or the counter value CTR is incremented after this, beginning at the falling edge of the first gap signal in the cycle or in each new period of the carrier signal. In the case of the rising edge of the second gap signal, the counter has a counter value that is within a range corresponding to a character value of "1." On the basis of the setting of the configuration register KR, transponder TR does not interpret this counter value as a reference counter value but decodes it immediately into a character value of "1." Next, the base station transmits another character value of "0" and finally ends the data transmission by generating no further field gaps within the maximum duration value tmax.

The two shown data transmission protocol types, with and without transmission of the reference duration tref, are only shown schematically. It is understood that apart from the shown data transmission protocol types it is possible to use other data transmission protocol types as well with the method or transponder of the invention.

Furthermore, the encoding of the transmitted character values "0" and "1" may occur, for example, also by means of different modulation degrees of the carrier signal generated by the base station. Instead of the encoding by durations between successive field gaps, the carrier signal may also be suppressed totally or partially for the shown durations t0, t1, tref, and tmax.

The configuration register KR of transponder TR is writable in a wireless manner by means of a command by the base station BS. Alternatively or in addition, configuration register KR can also be written during the manufacture of transponder TR, for example, by means of a wireless or hardwired programming device provided especially for this. If transponder TR is to communicate with a base station BS whose data transmission protocol type is currently not compatible with the data transmission protocol type set in the configuration register KR of the transponder, it is possible, for example, that the transponder recognizes this on its own and reconfigures its configuration register KR accordingly. Alternatively or in addition, it can be provided, for example, that the command to write the configuration register KR uses a transmission mechanism identical for both data transmission protocol types, for example, in both cases without transmission of the reference duration tref.

The shown embodiments have a high flexibility for use in different data transmission protocol types, because the data transmission protocol type may be set dynamically by setting the configuration register KR of transponder TR.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission between a base station and a passive transponder by inductive coupling, the method comprising:
    receiving data from the base station at the passive transponder, the data received via a first data transmission protocol type and via at least one second data transmission protocol type; and
    selecting the first or the at least second data transmission protocol type by writing a configuration register in the transponder;
    wherein the data received in the first data transmission protocol type and in the at least second data transmission protocol type comprises a carrier signal with a frequency within a frequency range from 50 KHz to 250 KHz, wherein a field gap in the carrier signal initiates the data transmission,
    wherein, characters received from the base station are encoded by associated durations between temporally successive field gaps, wherein a first character value is assigned a first duration, and wherein at least one second character value is assigned a second duration, and
    wherein, in the first data transmission protocol type, no reference duration is transmitted as a calibration value and, in the second data transmission protocol type, a reference duration is transmitted as the calibration value, the calibration value used for calibrating the subsequently received durations.

2. The method according to claim 1, wherein the configuration register is written in response to a command received from the base station.

3. The method according to claim 1, wherein, in the first data transmission protocol type, the data transmission is ended when a maximum duration value between successive field gaps is exceeded.

4. The method according to claim 1, wherein the reference duration is received from the base station, by which the calibration value is determined in the transponder.

5. The method according to claim 1, wherein writing the configuration register comprises writing an EEPROM in the transponder.

6. The method according to claim 1, further comprising receiving energy for operating the passive transponder solely from a signal received from the base station.

7. The method according to claim 1, further comprising:
    initializing an internal counter when a first field gap is received from the base station;
    incrementing the internal counter with each new period of the carrier signal.

8. A passive transponder for receiving wireless data transmission from a base station by means of inductive coupling, the passive transponder comprising:
    an antenna coil operable to receive data from the base station, the data received via a first data transmission protocol type and via at least one second data transmission protocol type; and
    a configuration register operable to select the first data transmission protocol type or the at least one second data transmission protocol type;
    wherein the data received from the base station comprises a carrier signal with a frequency within a frequency range from 50 KHz to 250 KHz, wherein a field gap in the carrier signal initiates the data transmission,
    wherein, characters received from the base station are encoded by associated durations between temporally successive field gaps, wherein a first character value is assigned a first duration, and wherein at least one second character value is assigned a second duration, and
    wherein, in the first data transmission protocol type, no reference duration is transmitted as a calibration value and, in the second data transmission protocol type, a reference duration is transmitted as the calibration value, the calibration value used for calibrating the subsequently received durations.

9. The passive transponder according to claim 8, wherein the configuration register is operable to select the first data transmission protocol type or the at least one second data transmission protocol type in response to a command received from the base station.

10. The passive transponder according to claim 8, wherein:
    in the first data transmission protocol type, the configuration register ends the data transmission when a maximum duration value between successive field gaps is exceeded.

11. The passive transponder according to claim 8, wherein:
    in response to receiving the reference duration in the at least one second data transmission protocol type from the base station, the configuration register is operable to determine the calibration value.

12. The passive transponder according to claim 8, wherein the configuration register comprises an EEPROM.

13. The passive transponder according to claim 8, wherein the configuration register is operable to receive energy for operating the passive transponder, the energy received solely from a signal received from the base station.

14. The passive transponder according to claim 8, wherein the configuration register is further operable to:
    initialize an internal counter when a first field gap is received from the base station;
    increment the internal counter with each new period of the carrier signal.

15. A non-transitory programmable memory comprising a program of instructions, the program of instructions operable when executed to:

receive data at a passive transponder, the data received from a base station, the data received via a first data transmission protocol type and via at least one second data transmission protocol type; and select the first or the at least second data transmission protocol type by writing a configuration register in the transponder;

wherein the data received in the first data transmission protocol type and in the at least second data transmission protocol type comprises a carrier signal with a frequency within a frequency range from 50 KHz to 250 KHz, wherein a field gap in the carrier signal initiates the data transmission, wherein, characters received from the base station are encoded by associated durations between temporally successive field gaps, wherein a first character value is assigned a first duration, and wherein at least one second character value is assigned a second duration, and wherein, in the first data transmission protocol type, no reference duration is transmitted as a calibration value and, in the second data transmission protocol type, a reference duration is transmitted as the calibration value, the calibration value used for calibrating the subsequently received durations.

16. The non-transitory programmable memory according to claim 15, wherein the instructions are further operable when executed to write the configuration register in response to a command received from the base station.

17. The non-transitory programmable memory according to claim 15, wherein the instructions are further operable when executed to end the data transmission, in the first data transmission protocol type, when a maximum duration value between successive field gaps is exceeded.

18. The non-transitory programmable memory according to claim 15, wherein the instructions are further operable when executed to determine the calibration value when the reference duration is received from the base station, the reference duration received in the at least second data transmission protocol type and after initiation of the data transmission.

19. The non-transitory programmable memory according to claim 15, wherein the configuration register comprises an EEPROM.

20. The non-transitory programmable memory according to claim 15, wherein the instructions are further operable when executed to receive energy for operating the passive transponder solely from a signal received from the base station.

21. The non-transitory programmable memory according to claim 15, wherein the instructions are further operable when executed to:

initialize an internal counter when a first field gap is received from the base station;

increment the internal counter with each new period of the carrier signal.

* * * * *